(12) United States Patent
Chen et al.

(10) Patent No.: US 12,492,161 B2
(45) Date of Patent: Dec. 9, 2025

(54) ORGANIC PROTON-TYPE IONIC LIQUID, TWO-DIMENSIONAL PEROVSKITE PURE-PHASE QUANTUM WELL FILM, PREPARATION METHOD AND USE THEREOF

(71) Applicant: Nanjing Tech University, Jiangsu (CN)

(72) Inventors: Yonghua Chen, Nanjing (CN); Hao Gu, Nanjing (CN); Yingdong Xia, Nanjing (CN); Wei Huang, Nanjing (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 792 days.

(21) Appl. No.: 17/784,003

(22) PCT Filed: Aug. 24, 2021

(86) PCT No.: PCT/CN2021/114258
§ 371 (c)(1),
(2) Date: Jun. 9, 2022

(87) PCT Pub. No.: WO2022/042529
PCT Pub. Date: Mar. 3, 2022

(65) Prior Publication Data
US 2023/0022061 A1    Jan. 26, 2023

(30) Foreign Application Priority Data
Aug. 25, 2020  (CN) .......................... 202010863816.2

(51) Int. Cl.
| | | |
|---|---|---|
| *C07C 211/07* | (2006.01) | |
| *B05D 1/00* | (2006.01) | |
| *B05D 3/02* | (2006.01) | |
| *B05D 3/12* | (2006.01) | |
| *C07C 211/62* | (2006.01) | |
| *C09K 11/66* | (2006.01) | |

(52) U.S. Cl.
CPC ............ *C07C 211/07* (2013.01); *B05D 1/005* (2013.01); *B05D 3/0218* (2013.01); *B05D 3/12* (2013.01); *C07C 211/62* (2013.01); *C09K 11/664* (2013.01)

(58) Field of Classification Search
CPC ..... C07C 211/62; C09K 11/664; B05D 1/005; B05D 3/0218; B05D 3/12
See application file for complete search history.

(56) References Cited

U.S. PATENT DOCUMENTS

| | | | |
|---|---|---|---|
| 6,361,940 B1 * | 3/2002 | Van Ness ............. | C12Q 1/6832 435/6.12 |
| 2018/0301646 A1 * | 10/2018 | Kanatzidis ............... | C30B 29/54 |
| 2019/0216714 A1 * | 7/2019 | Scheunemann .......... | A61K 8/44 |

FOREIGN PATENT DOCUMENTS

| | | | |
|---|---|---|---|
| CN | 103450018 A | 12/2013 | |
| CN | 110305019 | * 10/2019 | |
| CN | 110305019 A | 10/2019 | |
| CN | 111952455 A | 11/2020 | |
| CN | 112062680 A | 6/2021 | |
| WO | WO-2018141067 A1 * | 8/2018 | ................ C02F 1/26 |

OTHER PUBLICATIONS

International Search Report, PCT/CN2021/114258, Nov. 24, 2021.
Xiao et al., "Effects of methylammonium acetate on the perovskite film quality for the perovskite solar cell," Organic Electronics, vol. 65, Nov. 17, 2018, pp. 201-206.
Berton et al., "Separate mechanisms of ion oligomerization tune the physicochemical properties of n-butylammonium acetate: cation-base clusters vs. anion-acid dimers," Phys. Chem. Chyem. Phys., vol. 19, Dec. 31, 2017, p. 25544.

* cited by examiner

*Primary Examiner* — C Melissa Koslow
(74) *Attorney, Agent, or Firm* — Miller Nash LLP

(57) ABSTRACT

Disclosed are an organic proton-type ionic liquid, a film with a two-dimensional perovskite pure-phase quantum well structure, a preparation method and use thereof. The organic proton-type ionic liquid has a chemical formula of $RNH_3^+ \cdot CH_3COO^-$ or $RNH_3^+ \cdot RCOO^-$, where R represents an alkyl group of C4-8 or a phenyl group, preferably, the chemical formula thereof is $CH_3(CH_2)_3NH_3^+ \cdot CH_3COO^-$. The organic proton-type ionic liquid can be used to prepare perovskite material, the perovskite film prepared thereby can form a pure-phase single quantum well, with a crystal grain size therein reaching a level of micrometers or even millimeters.

8 Claims, 6 Drawing Sheets

ORGANIC PROTON-TYPE IONIC LIQUID, TWO-DIMENSIONAL PEROVSKITE PURE-PHASE QUANTUM WELL FILM, PREPARATION METHOD AND USE THEREOF

CROSS REFERENCE TO RELATED APPLICATIONS

This application is a 371 of International Application No. PCT/CN2021/114258, filed Aug. 24, 2021, which claims priority to and the benefit of Chinese Patent Application No. 202010863816.2, filed Aug. 25, 2020, the contents of which are incorporated by reference herein in their entirety.

TECHNICAL FIELD

The present disclosure relates to the field of organic and inorganic photoelectronic devices, in particular to an organic proton-type butylamine acetate ionic liquid, a film with a two-dimensional perovskite pure-phase quantum well structure, a preparation method and use thereof.

BACKGROUND

The existing low-dimensional perovskite materials are prepared by using the hydriodate and the hydrobromate of amine compounds as organic amine salts. The low-dimensional perovskite prepared by the existing materials and methods has a multi-phase mixed multi-quantum well structure, and a single pure-phase perovskite quantum well has not been obtained, especially a perovskite film with a higher quantum well width distribution.

SUMMARY

The objective of the present disclosure is to provide an organic proton-type ionic liquid, which can be used to prepare perovskite material.

Furthermore, the present disclosure also provides a method for preparing the above organic proton-type ionic liquid.

Furthermore, the present disclosure also provides a method for preparing a film with a two-dimensional perovskite pure-phase quantum well structure based on the organic proton-type ionic liquid.

Furthermore, the present disclosure also provides a use of the above organic proton-type ionic liquid.

The organic proton-type ionic liquid can be used as a new solvent for dissolving the perovskite precursor.

The organic proton-type butylamine acetate ionic liquid can be used as a potential electrolyte for lithium ion batteries.

The present disclosure provides an organic proton-type ionic liquid, wherein a chemical formula of the organic proton-type ionic liquid is $RNH_3^+ \cdot CH_3COO^-$, where R represents an alkyl group of C4-8 or a phenyl group; or $RNH_3^+ \cdot RCOO^-$, where R represents an alkyl group of C4-8 or a phenyl group.

In some embodiments, the organic proton-type ionic liquid is a butylamine acetate ionic liquid, and the chemical formula of the butylamine acetate ionic liquid is $CH_3(CH_2)_3NH_3^+ \cdot CH_3COO^-$.

The present disclosure provides a method for preparing the organic proton-type ionic liquid described above, comprising:

1) mixing a carboxyl group-containing organic acid and an amine group-containing organic amine in a molar ratio of an amine group and a carboxyl group of 1:1, then adding the same volume of a diluent as the amine group-containing organic amine, cooling to 0° C. and stirring to react for 2-2.5 h to obtain a mixture; and
2) removing the diluent and other organic impurities from the mixture by reduced pressure distillation at 80° C., then lowering the temperature to −4° C. for recrystallization, standing for 1 h to obtain a solidified mixture, washing the solidified mixture with 1000 mL of a volatile anti-solvent for 3 times, then dissolving the solidified mixture in 100 mL of a diluent, stirring for 30 min, and then removing the diluent by reduced pressure distillation at 80° C. to obtain the organic proton-type ionic liquid.

In some embodiments, the carboxyl group-containing organic acid includes one or more of acetic acid, butyric acid, pentanoic acid and hexanoic acid;
the amino group-containing organic amine is one or more selected from diaminobutane, diaminopentane and diaminohexane;
the diluent is one or more selected from water, ethanol, methanol, propanol and isopropanol; and
the volatile anti-solvent is an ether reagent.

In some embodiments, the ether reagent is diethyl ether.

The present disclosure provides a use of the organic proton-type ionic liquid described above in the fields of organic and inorganic photoelectric materials and semiconductor devices.

The present disclosure provides a use of the organic proton-type ionic liquid described above in the fields of new solvents for dissolving perovskite precursors and electrolytes for lithium-ion batteries.

The present disclosure provides a two-dimensional perovskite pure-phase quantum well material prepared based on an organic proton-type ionic liquid, wherein the chemical formula of the two-dimensional perovskite pure-phase quantum well material is $A_aB_bM_mX_x$, where A is a carbon chain organic cation, and a-value ranges from 0 to 2.5;
B is an amine group-containing monovalent cation, b-value satisfies $0 \leq b < m+1$, and m is any natural number and satisfies $m-1 \geq 0$; M is a divalent metal cation; and
X is one or more of halogen ion, carboxylate ion and thiocyanate ion, and x-value satisfies $3m-1 < x \leq 3m+1$.

In some embodiments, the carbon chain organic cation is one or more of $CH_3CH_2NH_3^+$, $CH_3CH_2CH_2NH_3^+$, $CH_3CH_2CH_2CH_2NH_3^+$, $CH_3CH_2CH_2CH_2CH_2NH_3^+$ and $CH_3CH_2CH_2CH_2CH_2CH_2NH_3^+$;
the amine group-containing monovalent cation is one or more of methylamine ion, formamidine ion, and guanidine ion; the divalent metal cation is one or more of lead ion, tin ion, copper ion, zinc ion, and manganese ion; and
the halogen is one or more of F, Cl, Br, and I.

In some embodiments, the chemical formula of the two-dimensional perovskite pure-phase quantum well material is $A_2B_2M_3X_{10}$.

In some embodiments, the chemical formula of the two-dimensional perovskite pure-phase quantum well material is $[CH_3(CH_2)_3NH_3]_2(CH_3NH_3)Pb_2I_7$, $[CH_3(CH_2)_3NH_3]_2(CH_3NH_3)_2Pb_3I_{10}$, $[CH_3(CH_2)_3NH_3]_2(CH_3NH_3)_3Pb_4I_{13}$ or $[CH_3(CH_2)_3NH_3]_2(CH_3NH_3)_4Pb_5I_{16}$.

The present disclosure provides a method for preparing a film with a two-dimensional perovskite pure-phase quantum well structure, comprising:

1) adding BX to a DMSO solution to prepare a DMSO mixture with a BX mass fraction of 1-35%;
2) adding the organic proton-type ionic liquid to the DMSO mixture prepared in step 2), mixing, stirring at 25° C. for 2 h, and then adding $MX_2$ thereto;
3) then adding 1600 µL of DMF reagent, heating to 65° C. and stirring until dissolved, and cooling to room temperature to obtain a mixed solution;
4) spin-coating the mixed solution prepared in step 3) while heating onto a surface of a glass substrate in air with a humidity of 20%-80%, and maintaining at a temperature of 25° C.-250° C. to obtain the film with the two-dimensional perovskite pure-phase quantum well structure;
where, a molar ratio of the organic proton-type ionic liquid, the BX and the $MX_2$ is 2:m+1:m;
the organic proton-type ionic liquid serves as a source of A, and the A corresponds to $RNH_3^+$ of the organic proton-type ionic liquid;
the BX is a compound salt of a monovalent cation; and
the $MX_2$ is a compound formed by a divalent metal cation and an X ion.

In some embodiments, a compound salt of the monovalent cation is one or more selected from a compound salt of methylamine ion, a compound salt of formamidine ion, and a compound salt of guanidine ion.

In some embodiments, an addition amount of the DMF reagent in the step 3) is 5-50 times an addition amount of the organic proton-type ionic liquid in volume.

In some embodiments, the spin-coating with heating comprises:
heating the glass substrate to a temperature of 80° C.-100° C., setting a spin-coating speed to 500-1000 rpm/min and performing spin-coating for 5-10 s, then setting a spin-coating speed to 2000-6000 rpm/min and performing spin-coating for 5-10 s, continuously heating the substrate between two spin-coating steps, covering a film obtained after the spin-coating with a petri dish with a diameter of 100 mm, and then subjecting the film to heat-treatment at a temperature of 80° C.-120° C. for 5-10 min.

In some embodiments, the method for preparing a film with a two-dimensional perovskite pure-phase quantum well structure comprises:
1) providing butylamine acetate ionic liquid as the organic proton-type ionic liquid, methyl ammonium iodide as the BX, and a lead iodide powder as the $MX_2$;
2) adding the methyl ammonium iodide to the DMSO solution to prepare a DMSO mixture with a mass fraction of the methyl ammonium iodide of 1-35 wt %;
3) adding the butylamine acetic acid ionic liquid to the DMSO mixture prepared in step 2), mixing, stirring at 25° C. for 2 h, and then adding the lead iodide powder thereto; then adding the DMF reagent, heating to 65° C., stirring until dissolved, and cooling to room temperature to obtain a mixed solution; and
4) spin-coating the mixed solution prepared in step 3) while heating onto the surface of the glass substrate in air with a humidity of 20%-80%, and maintaining the temperature at 25° C.-250° C.,
where a molar ratio of the butylamine acetate ionic liquid, the methyl ammonium iodide, and the lead iodide powder is 2:4:3.

Compared with the above background art, the present disclosure has the following advantages:

1) New organic butylamine acetate ionic liquid (BAAc, $CH_3(CH_2)_3NH_3^+ \cdot CH_3COO^-$) is used, which is cheaper and more readily available than traditional halogen chemicals.
2) The prepared perovskite film can form a pure-phase single quantum well, and the crystal grain size of the film can reach a level of micrometers or even millimeters.
3) The carboxyl group-containing organic amine salts can further increase the size and width of the single quantum well.

The low-dimensional perovskite materials prepared in the present disclosure is an ionic liquid molten salt formed based on the carboxylate of an organic amine compound. It is a new type of liquid, stable, inexpensive, and easily available organic amine salt, which can be used as a solvent to directly prepare perovskite materials.

The low-dimensional perovskite prepared by the existing materials and methods has a multi-phase mixed multi-quantum well structure, and the present disclosure provides a pure-phase quantum well structure, which is a major breakthrough in this field. Compared with the low-dimensional perovskite materials prepared by the existing methods and materials, the material in the present disclosure has the advantages of similar or superior photoelectric conversion efficiency, improved stability of the device, low cost, simpler operation, and more suitable for large-area preparation.

The low-dimensional perovskite material prepared by organic amine ionic liquid is more stable and efficient because of the extra hydrogen bonding and van der Waals force, which makes the inorganic layer and organic layer combine more strongly.

The prior art has not yet obtained a single pure-phase perovskite quantum well, especially a perovskite film with a higher quantum well width distribution. The two-dimensional perovskite pure-phase quantum well film prepared by the present disclosure has a purity of the special width quantum well more than 98%.

DETAILED DESCRIPTION

Figure 1:
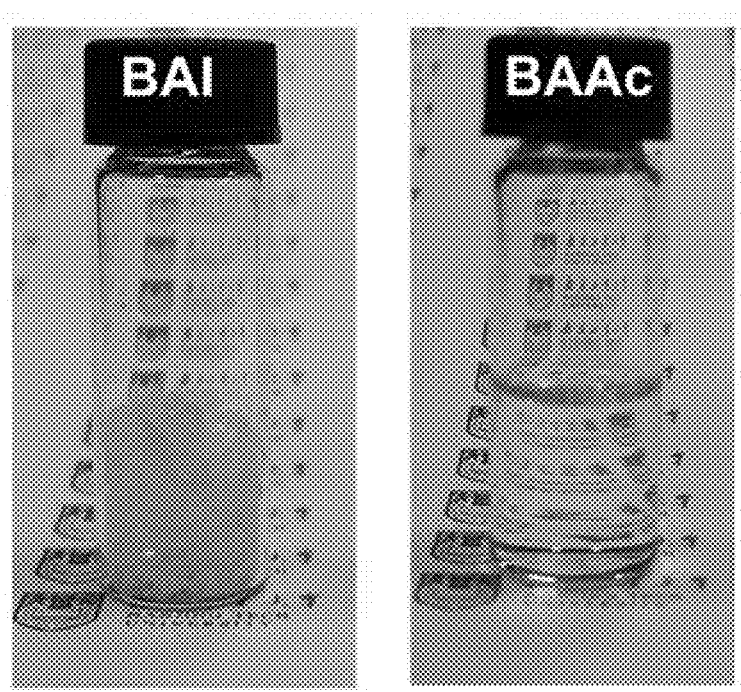
FIG. 1 shows the appearance of the organic proton-type butylamine acetate ionic liquid.
Figure 2:
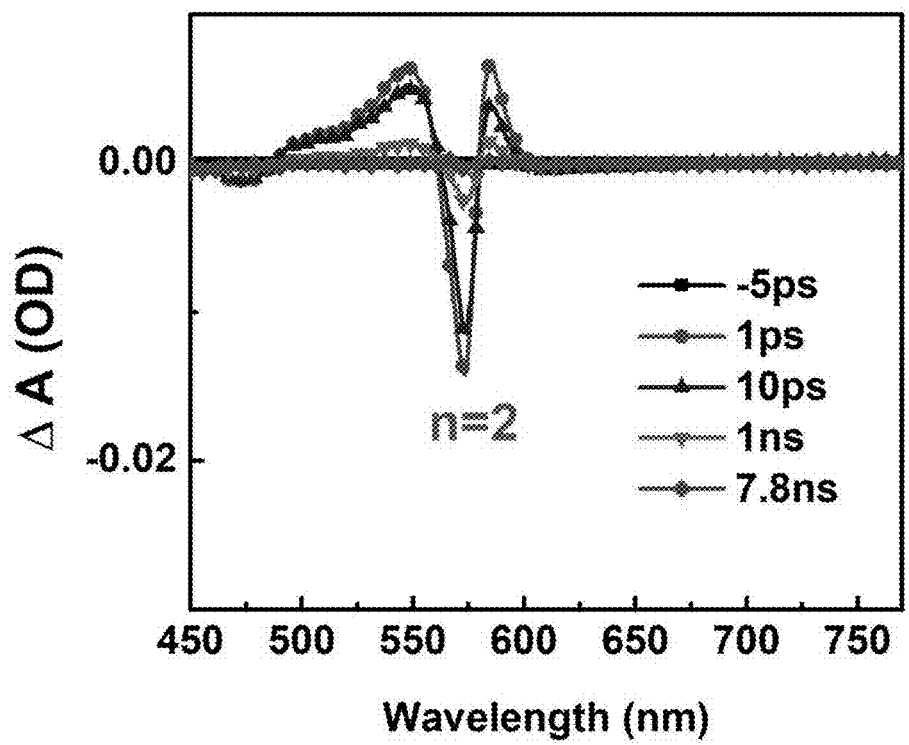
FIG. 2 is an ultrafast spectroscopic analysis spectrum of the two-dimensional perovskite pure-phase quantum well film prepared in Example 1.
Figure 3:
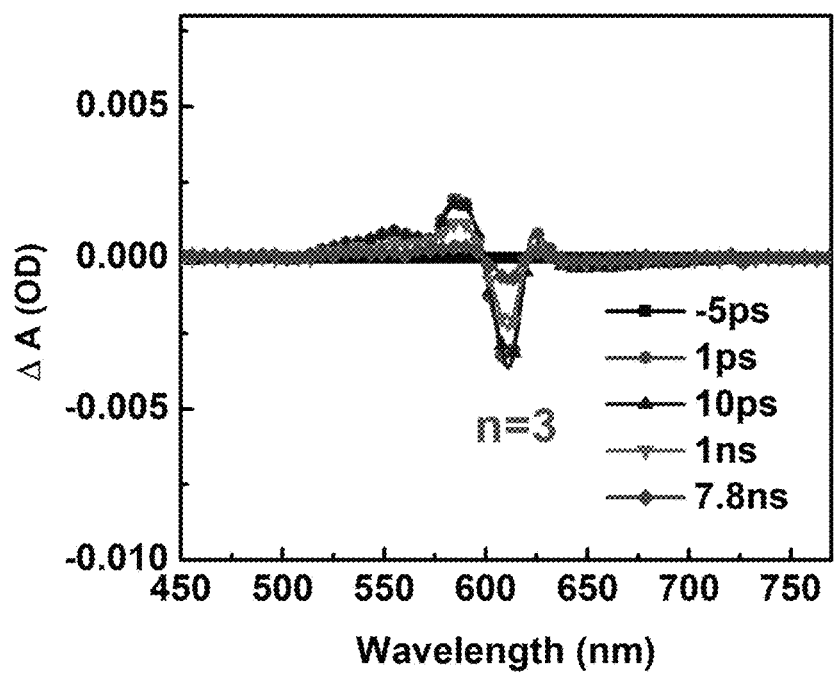
FIG. 3 is an ultrafast spectroscopic analysis spectrum of the two-dimensional perovskite pure-phase quantum well film prepared in Example 2.
Figure 4:
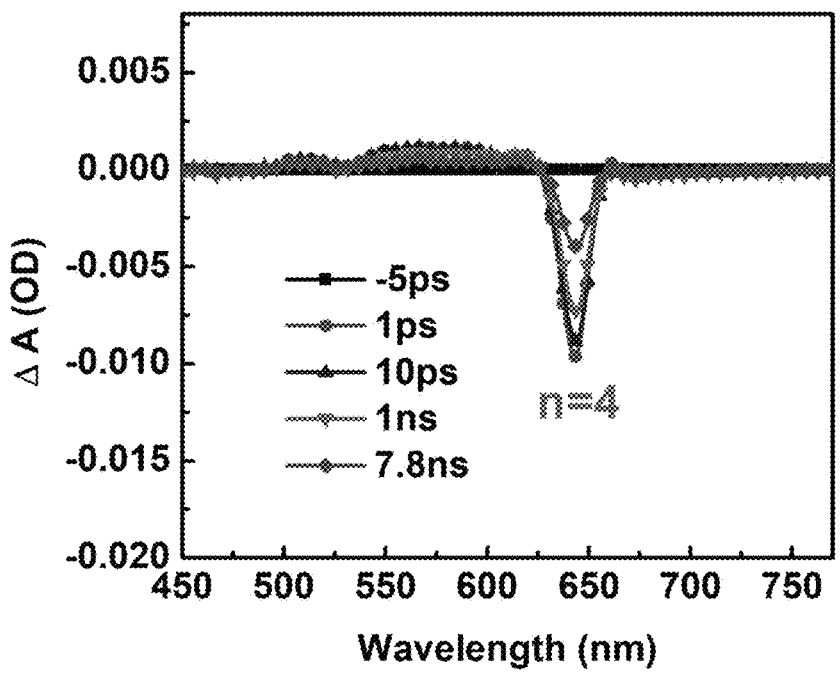
FIG. 4 is an ultrafast spectroscopic analysis spectrum of the two-dimensional perovskite pure-phase quantum well film prepared in Example 3.
Figure 5:
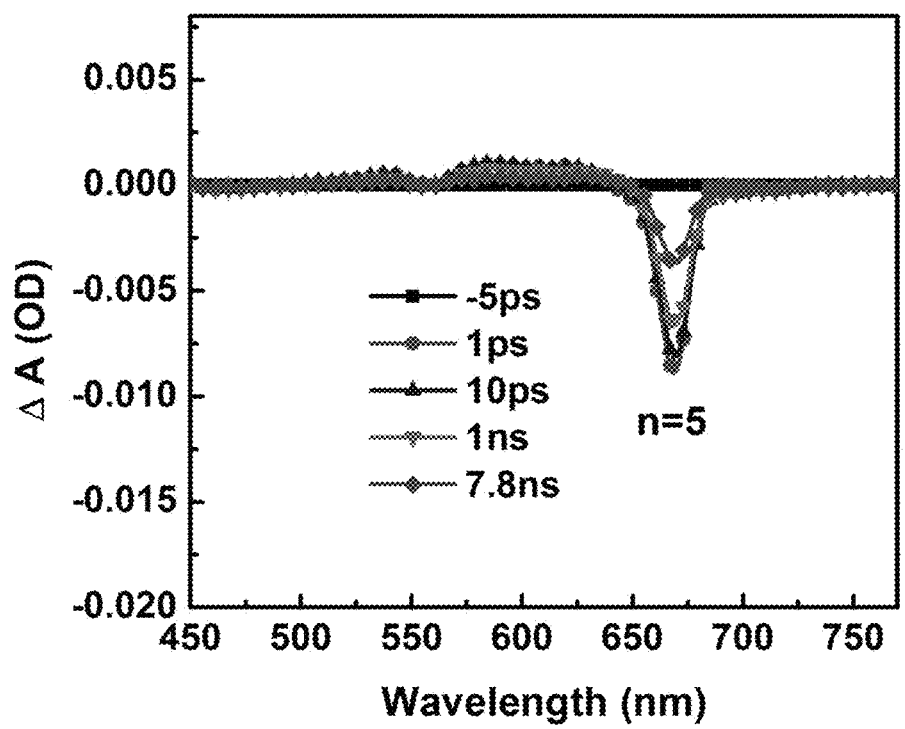
FIG. 5 is an ultrafast spectroscopic analysis spectrum of the two-dimensional perovskite pure-phase quantum well film prepared in Example 4.
Figure 6:
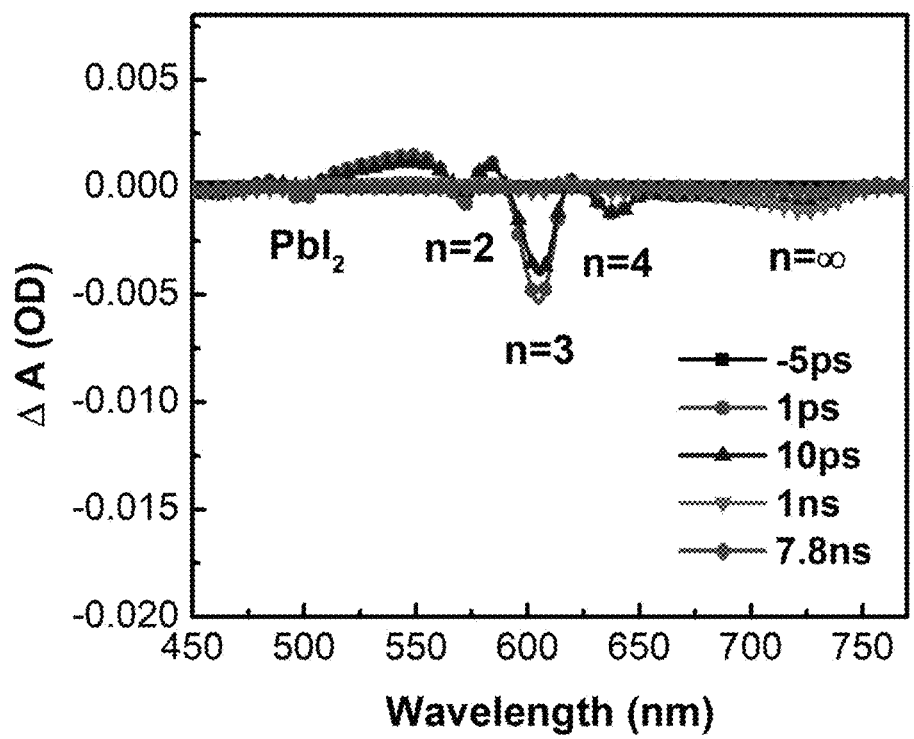
FIG. 6 is an ultrafast spectroscopic analysis spectrum of the two-dimensional perovskite pure-phase quantum well film prepared in Comparative Example 1.
Figure 7:
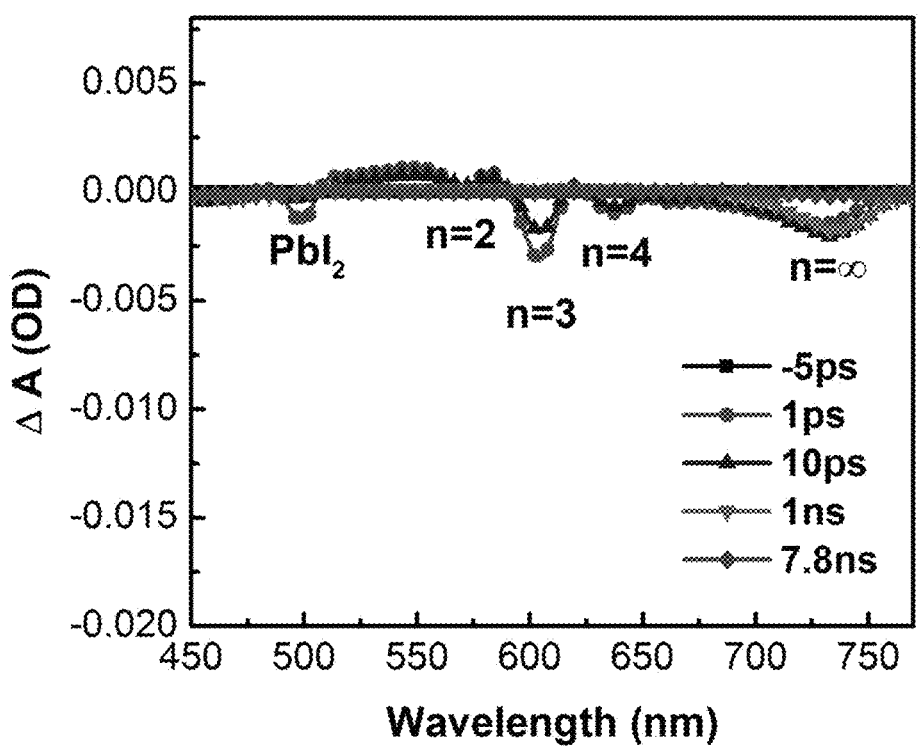
FIG. 7 is an ultrafast spectroscopic analysis spectrum of the two-dimensional perovskite pure-phase quantum well film prepared in Comparative Example 2.
Figure 8:
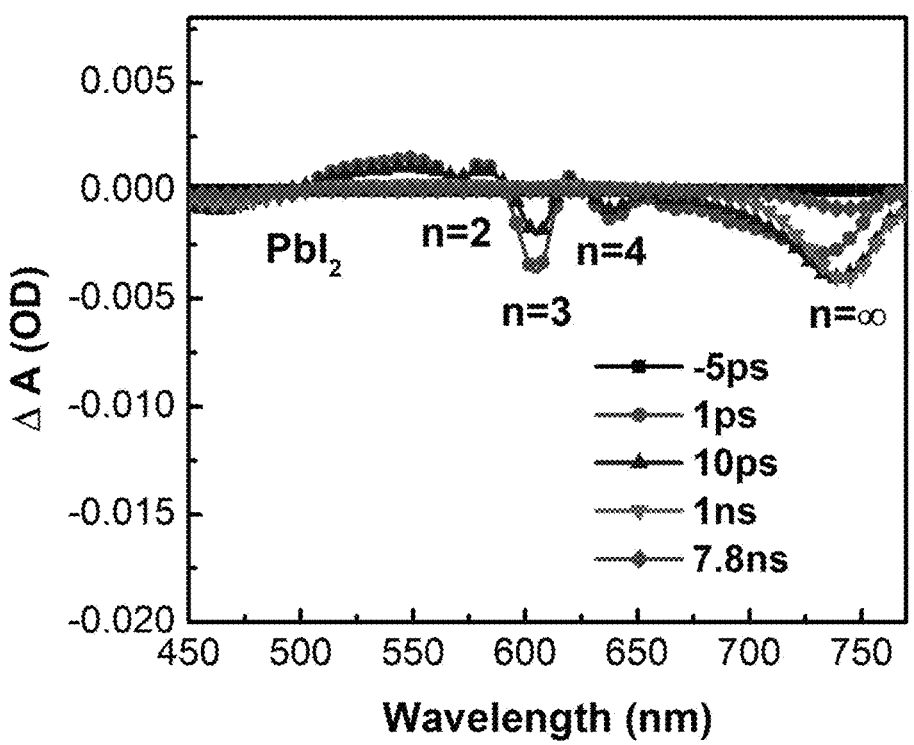
FIG. 8 is an ultrafast spectroscopic analysis spectrum of the two-dimensional perovskite pure-phase quantum well film prepared in Comparative Example 3.

In order to enable those skilled in the art to better understand the technical solutions of the present disclosure, the present disclosure will be further described in detail below with reference to the accompanying drawings and specific embodiments.

Source of raw materials.

Except for the organic amine salt ionic liquid, the materials used in the embodiments of the present disclosure are all commercially available, and the purity is higher than 98-99%.

The instruments and equipment used in the present disclosure are as follows:

magnetic heating stirrer (1 set), freezing thermostat (1 set), rotary evaporator (1 set), mechanical pump (1 set), heating spin-coater (1 set), spin-coater (2 sets), and glove box (1 set).

Preparation of organic proton-type butylamine acetate ionic liquid:

1) the acetic acid and 1-aminobutane were mixed in a molar ratio of 1:1, then the same volume of ethanol as 1-aminobutane was added, the temperature was cooled to 0° C. and stirred for 2 h to obtain a mixture; and
2) the ethanol and water were removed from the mixture by reduced pressure distillation at 80° C., then the temperature was lowered to −4° C. for recrystallization, a solidified mixture was obtained after standing for 1 h, the mixture was washed with 1000 mL of diethyl ether for 3 times, then the mixture was dissolved in 100 mL of ethanol, stirred for 30 min, and then the ethanol was removed by reduced pressure distillation at 80° C. to obtain an organic proton-type butylamine acetate ionic liquid ($CH_3(CH_2)_3NH_3^+ \cdot CH_3COO^-$).

As shown in the subgraph on the right side of FIG. 1, the organic proton-type butylamine acetate ionic liquid prepared by the present disclosure is a colorless and transparent liquid with good fluidity and special aromatic odor, which is a new type of environmentally friendly and pollution-free organic amine salt for low-dimensional perovskite. The subgraph on the left side of FIG. 1 is a common organic halogen organic amine salt, which is white powder or massive crystal in appearance.

Figure 11:
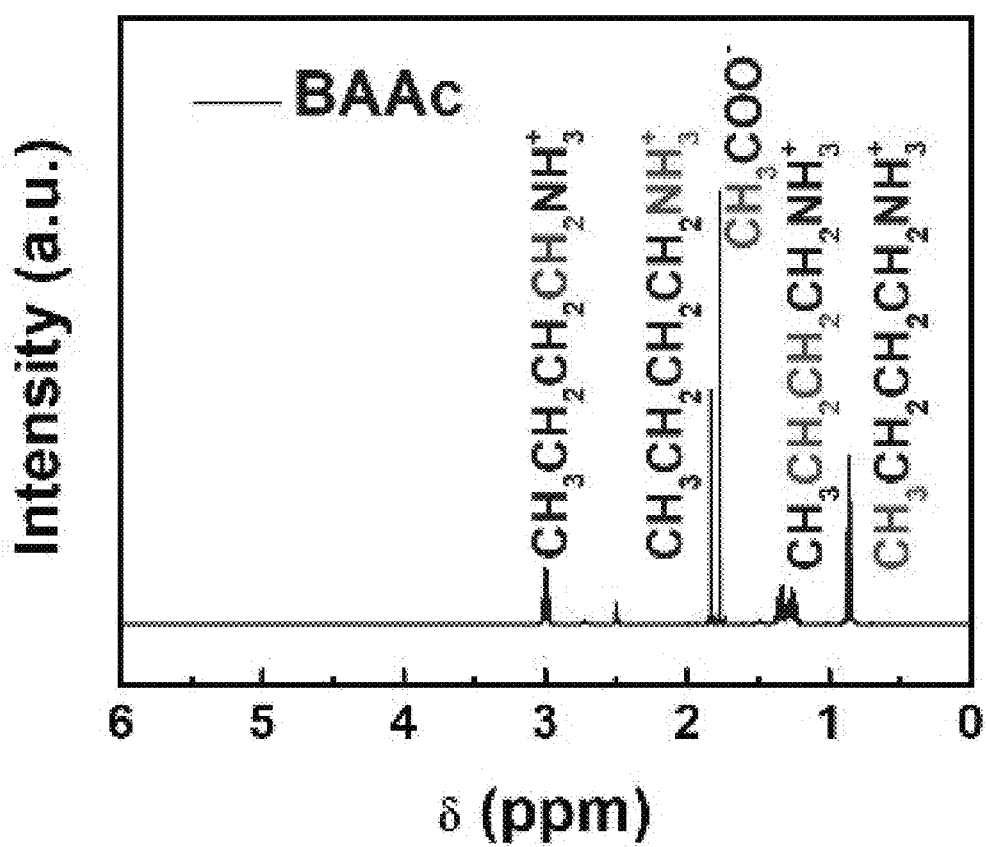
FIG. 11 is a nuclear magnetic resonance hydrogen spectrum of the proton-type butylamine acetate ionic liquid.

FIG. 11 is a nuclear magnetic resonance hydrogen spectrum of the organic proton-type butylamine acetate ionic liquid, indicating that the product is an ionic product composed of butylamine and acetate.

Example 1

Figure 9:
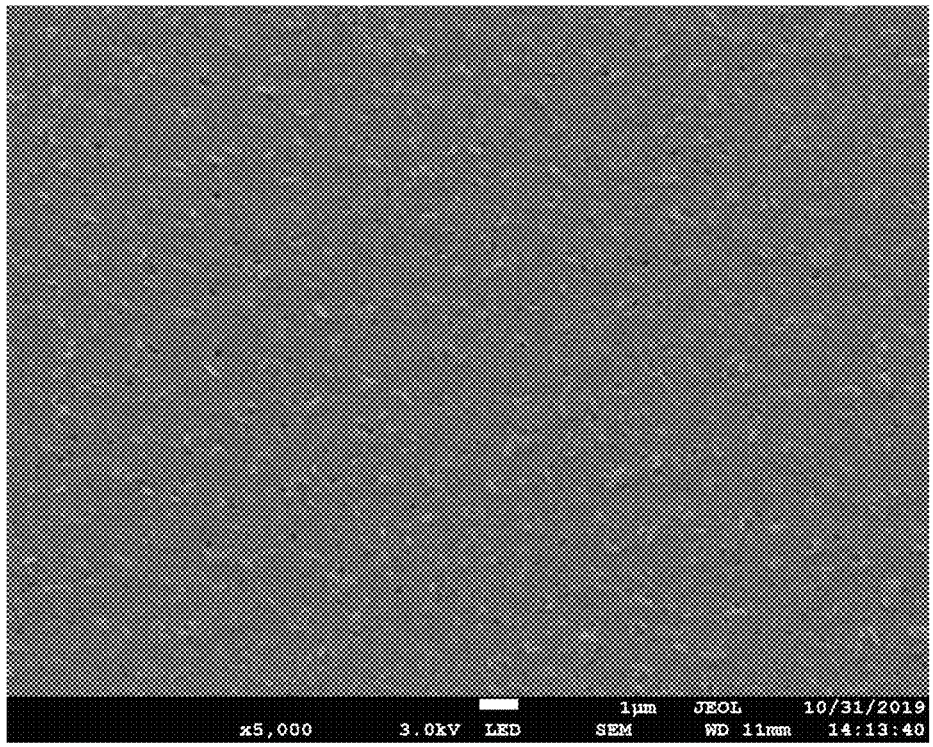
FIG. 9 is a scanning electron micrograph of the two-dimensional perovskite pure-phase quantum well film prepared in Example 1.
Figure 10:
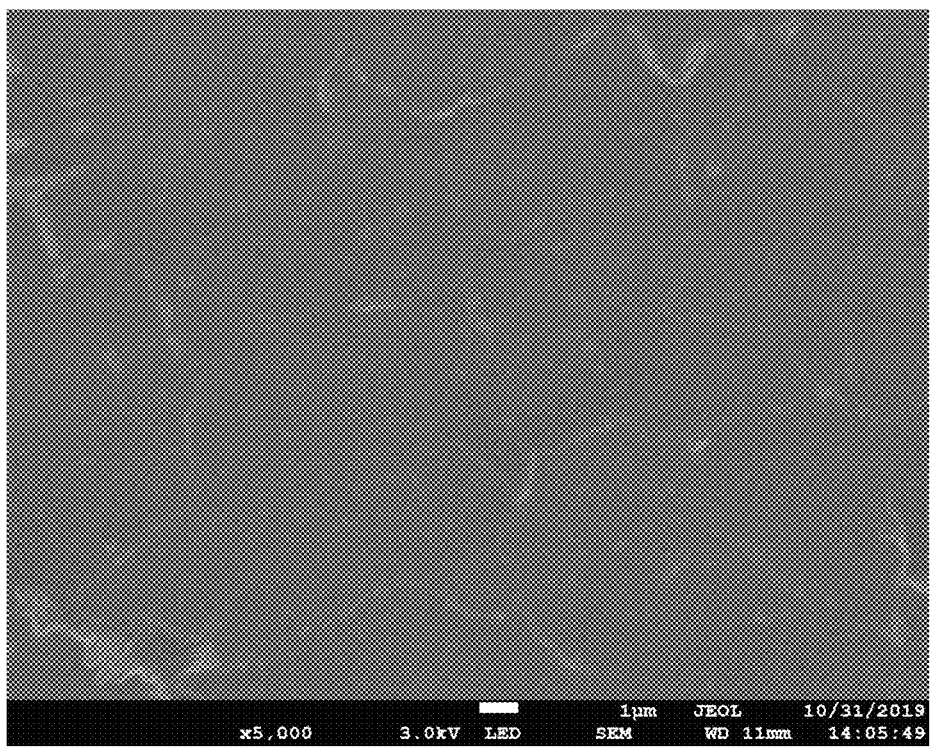
FIG. 10 is a scanning electron micrograph of the two-dimensional perovskite pure-phase quantum well film prepared in Comparative Example 1.

Preparation of two-dimensional perovskite pure-phase quantum well film (m-value is 2, a narrow quantum well structure with a broad band-gap):

82.94 mg of butylamine acetate ionic liquid $CH_3(CH_2)_3NH_3^+ \cdot CH_3COO^-$ was drawn, 148.72 mg of methyl ammonium iodide $CH_3NH_3I$ was weighed, then the two were preferentially mixed in 400 μL of DMSO solution, stirred fully at 25° C. for about 2 h. When the solution was uniform, 287.48 mg of $PbI_2$ powder was weighed, and then 1600 μL of DMF reagent was drawn to be added in the solution to obtain a mixture, the mixture was continued to heat and stir at 65° C. until it was completely dissolved, and finally cooled to room temperature for use. The mixture was subjected to heating coating in air with a humidity of 20%-80%, the glass substrate was maintained smooth and tidy during the entire coating process, and the temperature was maintained at 25° C. to 250° C. First, the glass substrate was heated to 80-100° C., the spin-coating speed was set to 500-1000 rpm/min, and the spin-coating time was 5-10 s, secondly, the spin-coating speed was set to 2000-6000 rpm/min, the spin-coating time was 5-10 s, the substrate was heated continuously between the two spin-coating steps. The film obtained after spin-coating was covered with a petri dish with a diameter of 100 mm, and then subjected to a heat treatment at 80-120° C. Finally, a flat and smooth two-dimensional perovskite pure-phase quantum well film with micron-level grains was obtained, as shown in FIG. 9, of which the chemical formula is $[CH_3(CH_2)_3NH_3]_2(CH_3NH_3)Pb_2I_7$. FIG. 10 is a two-dimensional perovskite multi-phase quantum well film prepared by butylamine iodine.

Example 2

Preparation of two-dimensional perovskite pure-phase quantum well film:

56.78 mg of butylamine acetate ionic liquid $CH_3(CH_2)_3NH_3^+ \cdot CH_3COO^-$ was drawn, 135.89 mg of methyl ammonium iodide $CH_3NH_3I$ was weighed, then the two were preferentially mixed in 400 μL of DMSO solution, stirred fully at 25° C. for about 2 h. When the solution was uniform, 295.51 mg of $PbI_2$ powder was weighed, and then 1600 μL of DMF reagent was drawn to be added in the solution to obtain a mixture, the mixture was continued to heat and stir at 65° C. until it was completely dissolved, and finally cooled to room temperature for use. The mixture was subjected to heating coating in air with a humidity of 20%-80%, the glass substrate was maintained smooth and tidy during the entire coating process, and the temperature was maintained at 25° C. to 250° C. First, the glass substrate was heated to 80-100° C., the spin-coating speed was set to 500-1000 rpm/min, and the spin-coating time was 5-10 s, secondly, the spin-coating speed was set to 2000-6000 rpm/min, the spin-coating time was 5-10 s, the substrate was heated continuously between the two spin-coating steps. The film obtained after spin-coating was covered with a petri dish with a diameter of 100 mm, and then subjected to a heat treatment at 80-120° C. Finally, a flat and smooth two-dimensional perovskite pure-phase quantum well film with micron-level grains was obtained with a chemical formula of $[CH_3(CH_2)_3NH_3]_2(CH_3NH_3)_2Pb_3I_{10}$.

Example 3

Preparation of two-dimensional perovskite pure-phase quantum well film (m-value is 4, a broad quantum well structure with a narrow band-gap):

43.18 mg of butylamine acetate ionic liquid $CH_3(CH_2)_3NH_3^+ \cdot CH_3COO^-$ was drawn, 129.06 mg of methyl ammonium iodide $CH_3NH_3I$ was weighed, then the two were preferentially mixed in 400 μL of DMSO solution, stirred fully at 25° C. for about 2 h. When the solution was uniform, 299.36 mg of $PbI_2$ powder was weighed, and then 1600 μL of DMF reagent was drawn to be added in the solution to obtain a mixture, the mixture was continued to heat and stir at 65° C. until it was completely dissolved, and finally cooled to room temperature for use. The mixture was subjected to heating coating in air with a humidity of 20%-80%, the glass substrate was maintained smooth and tidy during the entire coating process, and the temperature was maintained at 25° C. to 250° C. First, the glass substrate was heated to 80-100° C., the spin-coating speed was set to 500-1000 rpm/min, and the spin-coating time was 5-10 s, secondly, the spin-coating speed was set to 2000-6000 rpm/min, the spin-coating time was 5-10 s, the substrate was heated continuously between the two spin-coating steps. The film obtained after spin-coating was covered with a petri dish with a diameter of 100 mm, and then subjected to a heat treatment at 80-120° C. Finally, a flat and smooth two-dimensional perovskite pure-phase quantum well film with micron-level grains was obtained, of which the chemical formula is $[CH_3(CH_2)_3NH_3]_2(CH_3NH_3)_3Pb_4I_{13}$.

Example 4

Preparation of two-dimensional perovskite pure-phase quantum well film (m-value is 5, a broad quantum well structure with a narrow band-gap):

34.84 mg of butylamine acetate ionic liquid $CH_3(CH_2)_3NH_3^+ \cdot CH_3COO^-$ was drawn, 124.92 mg of methyl ammonium iodide $CH_3NH_3I$ was weighed, then the two were preferentially mixed in 400 μL of DMSO solution, stirred fully at 25° C. for about 2 h. When the solution was uniform, 295.51 mg of $PbI_2$ powder was weighed, and then 1600 μL of DMF reagent was drawn to be added in the solution to obtain a mixture, the mixture was continued to heat and stir at 65° C. until it was completely dissolved, and finally cooled to room temperature for use. The mixture was subjected to heating coating in air with a humidity of 20%-80%, the glass substrate was maintained smooth and tidy during the entire coating process, and the temperature was maintained at 25° C. to 250° C. First, the glass substrate was heated to 80-100° C., the spin-coating speed was set to 500-1000 rpm/min, and the spin-coating time was 5-10 s, secondly, the spin-coating speed was set to 2000-6000 rpm/min, the spin-coating time was 5-10 s, and the substrate was heated continuously between the two spin-coating steps. The film obtained after spin-coating was covered with a petri dish with a diameter of 100 mm, and then subjected to a heat treatment at 80-120° C. Finally, a flat and smooth two-dimensional perovskite pure-phase quantum well film with micron-level grains was obtained, of which the chemical formula is $[CH_3(CH_2)_3NH_3]_2(CH_3NH_3)_4Pb_5I_{16}$.

Comparative Example 1 a. The n-butylamine iodide $CH_3(CH_2)_3NH_3I$, methylamine chloride $CH_3NH_3Cl$, and lead iodide $PbI_2$ were dissolved in methylamine acetate in a molar ratio of 2:3:4, and stirred at 60° C. for 1 h-24 h to obtain a precursor solution with a concentration of 200 mg·mL$^{-1}$; b. The precursor solution was preheated to 50° C.-100° C., and then spin-coated for 10 s-60 s on a heating spin-coater at 60° C.-130° C., and the heating was continued during the whole spin-coating process, and then gradient annealing was performed at 60° C. to 100° C. for 3 min-10 min to obtain a mixed multi-quantum well perovskite film with no fixed chemical formula. Its main components include $[CH_3(CH_2)_3NH_3]_2(CH_3NH_3)Pb_2I_7$, $[CH_3(CH_2)_3NH_3]_2(CH_3NH_3)_2Pb_3I_{10}$, $[CH_3(CH_2)_3NH_3]_2(CH_3NH_3)_3Pb_4I_{13}$, $[CH_3(CH_2)_3NH_3]_2(CH_3NH_3)_4Pb_5I_{16}$ and $CH_3NH_3PbI_3$.

Comparative Example 2 a. The n-butylamine iodide $CH_3(CH_2)_3NH_3I$, methylamine chloride $CH_3NH_3Cl$, and lead iodide $PbI_2$ were dissolved in DMF at the molar ratio of 2:3:4, and stirred at 60° C. for 1 h-24 h to prepare a precursor solution with a concentration of 200 mg·mL$^{-1}$; b. The precursor solution was preheated to 50° C.-100° C., and then spin-coated for 10 s-60 s on a room-temperature spin-coater at 60° C.-130° C., and then gradient annealing was performed at 60° C. to 100° C. for 3 min-10 min to obtain a mixed multi-quantum well perovskite film with no fixed chemical formula. Its main components include $[CH_3(CH_2)_3NH_3]_2(CH_3NH_3)Pb_2I_7$, $[CH_3(CH_2)_3NH_3]_2(CH_3NH_3)_2Pb_3I_{10}$, $[CH_3(CH_2)_3NH_3]_2(CH_3NH_3)_3Pb_4I_{13}$, $[CH_3(CH_2)_3NH_3]_2(CH_3NH_3)_4Pb_5I_{16}$ and $CH_3NH_3PbI_3$.

Comparative Example 3 a. The butylamine acetate ionic liquid $CH_3(CH_2)_3NH_3^+ \cdot CH_3COO^-$, methylamine chloride $CH_3NH_3Cl$, and lead iodide $PbI_2$ were dissolved in DMF at the molar ratio of 2:3:4, and stirred at 60° C. for 1 h-24 h to prepare a precursor solution with a concentration of 200 mg·mL$^{-1}$; b. The precursor solution was preheated to 50° C.-100° C., and then spin-coated for 10 s-60 s on a room-temperature spin-coater at 60° C.-130° C., and then gradient annealing was performed at 60° C. to 100° C. for 3 min-10 min to obtain a mixed multi-quantum well perovskite film with no fixed chemical formula. The main components include $[CH_3(CH_2)_3NH_3]_2(CH_3NH_3)Pb_2I_7$, $[CH_3(CH_2)_3NH_3]_2(CH_3NH_3)_2Pb_3I_{10}$, $[CH_3(CH_2)_3NH_3]_2(CH_3NH_3)_3Pb_4I_{13}$, $[CH_3(CH_2)_3NH_3]_2(CH_3NH_3)_4Pb_5I_{16}$ and $CH_3NH_3PbI_3$.

The two-dimensional perovskite pure-phase quantum well films prepared in Examples 1, 2, 3, 4 and Comparative Examples 1, 2, and 3 were subjected to ultrafast spectroscopy analysis. The equipment name and test conditions are as follows: ultrafast system HELIOS-TA spectrometer, the laser source is a Coherent Legend regenerative amplifier (150 fs, 1 KHz, 800 nm) injected by a Coherent Vitesse oscillator (100 fs, 80 MHz). Broadband probe pulse (420-780 nm) is generated by focusing a small part (about 10 mj) of a basic 800 nm laser pulse onto a 2 mm sapphire plate to obtain FIG. 2, FIG. 3, FIG. 4, FIG. 5, FIG. 6, FIG. 7 and FIG. 8, respectively.

It can be seen from the figures that the two-dimensional perovskite pure-phase quantum well film prepared in Example 1 has a single perovskite pure-phase quantum well with an n-value of 2, i.e. the distribution width of the quantum well is two lead-iodine octahedrons on average, it is well distributed with no quantum wells with other n values, and the purity is close to 100%. According to the scanning electron micrographs, it can be seen that the grain size of the perovskite film has reached the micron level with a high crystallinity, the film is dense and has no holes, and the surface is smooth and flat.

The two-dimensional perovskite pure-phase quantum well film prepared in Example 2 has a single perovskite pure-phase quantum well with an n value of 3, i.e. the distribution width of the quantum well is three lead-iodine octahedrons on average, it is well distributed with no quantum wells with other n values, and the purity is close to 100%.

The two-dimensional perovskite pure-phase quantum well film prepared in Example 3 has a single perovskite pure-phase quantum well with an n value of 4, i.e. the distribution width of the quantum well is four lead-iodine octahedrons on average, it is well distributed with no quantum wells with other n values, and the purity is more than 98%.

The two-dimensional perovskite pure-phase quantum well film prepared in Example 4 has a single perovskite pure-phase quantum well with an n value of 5, i.e. the distribution width of the quantum well is five lead-iodine octahedrons on average, it is well distributed with no quantum wells with other n values, and the purity is more than 98%.

The two-dimensional perovskite multiphase quantum well film prepared in Comparative Example 1 has a target quantum well width of 4, but a complex multiphase quantum well film is actually obtained, which contains phases with various widths of 2, 3, 4 and infinite three-dimensional perovskite parts, and even impurity phases such as lead iodide. It can be seen from the scanning electron micrographs that the perovskite film has a smaller grain size in the nanometer range, and the crystallinity of the grain is average, the film has a small number of holes and a high surface roughness.

The two-dimensional perovskite multiphase quantum well film prepared in Comparative Example 2 has a target quantum well width of 4, but a complex multiphase quantum well film is actually obtained, which contains phases with various widths of 2, 3, 4 and infinite three-dimensional perovskite parts, even the content of infinity phase is more, and there are still impurity phases such as lead iodide.

The two-dimensional perovskite multiphase quantum well film prepared in Comparative Example 3 has a target quantum well width of 4, but a complex multiphase quantum well film is actually obtained, which contains phases with various widths of 2, 3, 4 and infinite three-dimensional perovskite parts, even the content of infinity phase is more, and there is still a small amount of impurity phases such as lead iodide.

It can be seen that the films prepared in Examples 1-3 are significantly better than the films prepared in Comparative Examples 1 and 2 in terms of crystallinity, grain size, especially the width distribution and purity of quantum wells.

The foregoing description of the disclosed embodiments enables those skilled in the art to implement or use the present disclosure. Various modifications to these embodiments will be obvious to those skilled in the art, and the general principles defined herein can be implemented in other embodiments without departing from the spirit or scope of the present disclosure. Therefore, the present disclosure will not be limited to the embodiments shown in this document, but should conform to the widest scope consistent with the principles and novel features disclosed in this document.

What is claimed is:

1. A method for preparing a film with a two-dimensional perovskite pure-phase quantum well structure, the two-dimensional perovskite pure-phase quantum well structure having a chemical formula of $A_aB_bM_mX_x$, where A is a carbon chain organic cation, and a-value ranges from 0 to 2.5; B is an amine group-containing monovalent cation, b-value satisfies $0 \leq b < m+1$, and m is any natural number and satisfies $m-1 \geq 0$; M is a divalent metal cation; and X is one or more of halogen ion, carboxylate ion and thiocyanate ion, and x-value satisfies $3m-1 < x \leq 3m+1$;

the method comprising:
1) Adding BX to a DMSO solution to prepare a DMSO mixture with a BX mass fraction of 1-35%;
2) Adding an organic proton-type ionic liquid to the DMSO mixture prepared in step 1), mixing, stirring at 25° C. for 2 hours, and then adding $MX_2$ thereto;
3) Then adding 1600 μL of a DMF reagent, heating to 65° C. and stirring until dissolved, and cooling to room temperature to obtain a mixed solution; and
4) Spin-coating the mixed solution prepared in step 3) while heating onto a surface of a glass substrate in air with a humidity of 20%-80%, and maintaining at a temperature of 25° C.-250° C. to obtain the film with the two-dimensional perovskite pure-phase quantum well structure;

wherein a molar ratio of the organic proton-type ionic liquid, the BX, and the $MX_2$ is 2:m+1:m;
the BX is a compound salt of a monovalent cation;
the $MX_2$ is a compound formed by a divalent metal cation and an X ion;
the organic proton-type ionic liquid serves as a source of A, and has a chemical formula of $RNH_3^+ \cdot CH_3COO^-$ where R represents an alkyl group of C4-8 or a phenyl group, or a chemical formula of $RNH_3^+ \cdot RCOO^-$ where R represents an alkyl group of C4-8 or a phenyl group; and
the A corresponds to $RNH_3^+$ of the organic proton-type ionic liquid.

2. The method according to claim 1, wherein the compound salt of the monovalent cation is one or more selected from the group consisting of: a compound salt of methylamine ion, a compound salt of formamidine ion, and a compound salt of guanidine ion.

3. The method according to claim 1, wherein an addition amount of the DMF reagent in step 3) is 5-50 times an addition amount of the organic proton-type ionic liquid in volume.

4. The method according to claim 1, wherein the spin-coating the mixed solution prepared in step 3) while heating comprises:
heating the glass substrate to a temperature of 80° C.-100° C., setting a spin-coating speed to 500-1000 rpm/min and performing spin-coating for 5-10 s, then setting a spin-coating speed to 2000-6000 rpm/min and performing spin-coating for 5-10 s, continuously heating the substrate between the two spin-coating steps, covering a film obtained after the spin-coating with a petri dish with a diameter of 100 mm, and then subjecting the film to heat-treatment at a temperature of 80° C. to 120° C. for 5-10 minutes.

5. The method according to claim 1, comprising:
1) Providing butylamine acetate ionic liquid as the organic proton-type ionic liquid, methyl ammonium iodide as the BX and lead iodide powder as the $MX_2$;
2) Adding the methyl ammonium iodide to the DMSO solution to prepare a DMSO mixture with a mass fraction of the methyl ammonium iodide of 1-35 wt %;
3) Adding the butylamine acetate ionic liquid to the DMSO mixture prepared in step 2), mixing, stirring at 25° C. for 2 hours, and then adding the lead iodide powder thereto; then adding the DMF reagent, heating to 65° C., stirring until dissolved, and cooling to room temperature to obtain a mixed solution; and 4) Spin-coating the mixed solution prepared in step 3) while heating onto a surface of a glass substrate in air with a humidity of 20%-80%, and maintaining the temperature at 25° C. to 250° C., wherein a molar ratio of the butylamine acetate ionic liquid, the methyl ammonium iodide, and the lead iodide powder is 2:4:3.

6. The method according to claim 1, wherein the organic proton-type ionic liquid is a butylamine acetate ionic liquid, having a chemical formula of $CH_3(CH_2)_3NH_3^+ \cdot CH_3COO$.

7. The method according to claim 1, wherein the two-dimensional perovskite pure-phase quantum well material has the chemical formula of $A_2B_2M_3X_{10}$.

8. The method according to claim 1, wherein the A is $CH_3(CH_2)_3NH_3^\pm$, the B is $CH_3NH_3^+$, the M is $Pb^{2+}$, and the X is I, the two-dimensional perovskite pure-phase quantum well material prepared has the chemical formula of $[CH_3(CH_2)_3NH_3]_2(CH_3NH_3)Pb_2I_7$, $[CH_3(CH_2)_3NH_3]_2(CH_3NH_3)_2Pb_3I_{10}$, $[CH_3(CH_2)_3NH_3]_2(CH_3NH_3)_3Pb_4I_{13}$, or $[CH_3(CH_2)_3NH_3]_2(CH_3NH_3)_4Pb_5I_{16}$.

* * * * *